US010458660B2

(12) United States Patent
Fleming

(10) Patent No.: US 10,458,660 B2
(45) Date of Patent: Oct. 29, 2019

(54) MAGNETIC APPLIANCE SHELF AND METHOD OF ASSEMBLY

(71) Applicant: Barry & Bamboo LLC, Milwaukee, WI (US)

(72) Inventor: Scott James Fleming, Milwaukee, WI (US)

(73) Assignee: Barry & Bamboo LLC, Milwaukee, WI (US)

( * ) Notice: Subject to any disclaimer, the term of this patent is extended or adjusted under 35 U.S.C. 154(b) by 1 day.

(21) Appl. No.: 15/825,331

(22) Filed: Nov. 29, 2017

(65) Prior Publication Data

US 2018/0180296 A1 Jun. 28, 2018

Related U.S. Application Data

(60) Provisional application No. 62/498,408, filed on Dec. 27, 2016.

(51) Int. Cl.
| | | |
|---|---|---|
| A47G 1/17 | (2006.01) |
| F24C 15/12 | (2006.01) |
| A47B 96/02 | (2006.01) |
| A47B 97/00 | (2006.01) |
| F16B 12/10 | (2006.01) |
| F16B 1/00 | (2006.01) |

(52) U.S. Cl.
CPC ............ *F24C 15/12* (2013.01); *A47B 96/021* (2013.01); *A47B 97/00* (2013.01); *F16B 12/10* (2013.01); *F16B 2001/0035* (2013.01)

(58) Field of Classification Search
CPC .................... F16B 2001/0035; A47G 1/17
USPC ...................................... 248/206.5; 206/350
See application file for complete search history.

(56) References Cited

U.S. PATENT DOCUMENTS

| 3,842,980 | A | * | 10/1974 | Kushner | .................. B25H 3/04 |
| | | | | | 211/DIG. 1 |
| 5,544,747 | A | * | 8/1996 | Horn | ........................ B25H 3/04 |
| | | | | | 206/350 |
| 6,811,127 | B1 | * | 11/2004 | Shiao | ....................... B25H 3/04 |
| | | | | | 211/70.6 |
| 6,923,317 | B2 | * | 8/2005 | Coleman, Jr. | ........... B25H 3/003 |
| | | | | | 206/350 |
| 9,920,877 | B2 | * | 3/2018 | Conti | ..................... A47G 23/02 |
| 2002/0130231 | A1 | * | 9/2002 | Winnard | .................. B25H 3/04 |
| | | | | | 248/206.5 |
| 2006/0192062 | A1 | * | 8/2006 | Tunze | .................... A01K 63/10 |
| | | | | | 248/206.5 |
| 2008/0210835 | A1 | * | 9/2008 | Bagnall | ................ A01K 63/006 |
| | | | | | 248/206.5 |
| 2013/0050973 | A1 | * | 2/2013 | Rohrbach | ........... B60R 11/0252 |
| | | | | | 361/807 |

* cited by examiner

*Primary Examiner* — Steven M Marsh
(74) *Attorney, Agent, or Firm* — Boyle Fredrickson, S.C.

(57) ABSTRACT

According to a further aspect of the disclosure, a support structure for releasable attachment to an appliance includes a support surface, a first lip disposed on one edge of the support surface and at least one magnet disposed on the support surface and engageable with a complementary surface of the appliance.

9 Claims, 3 Drawing Sheets

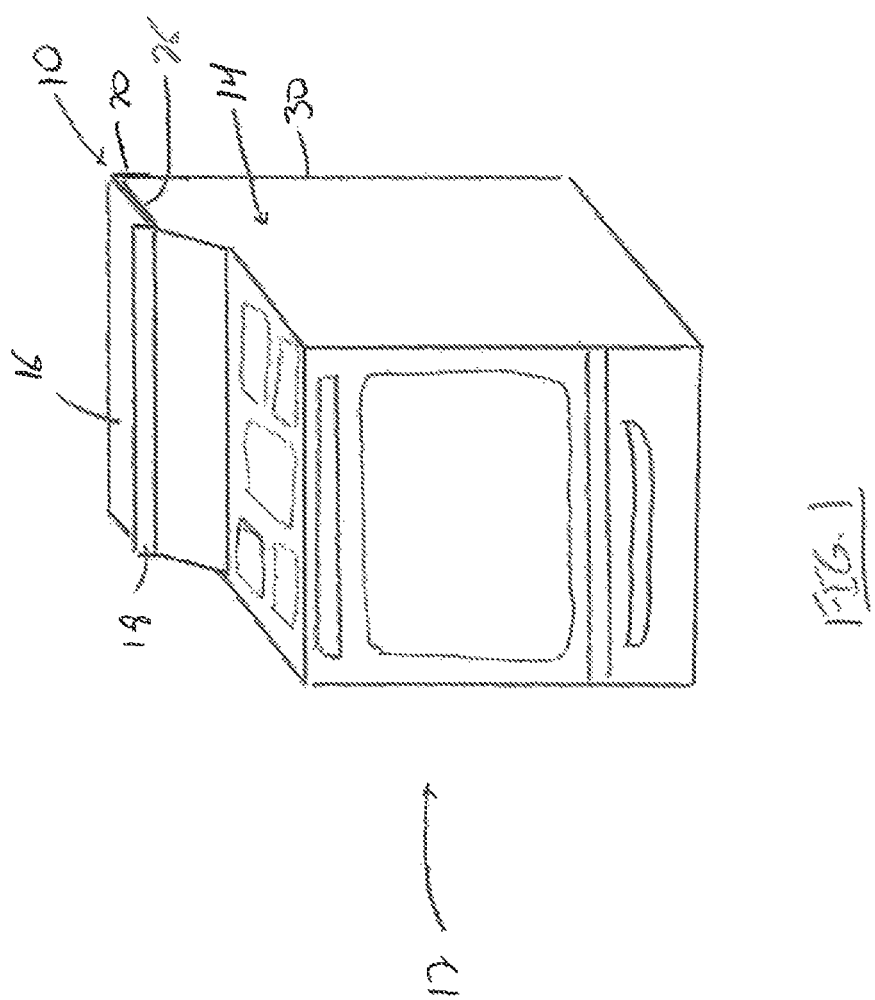

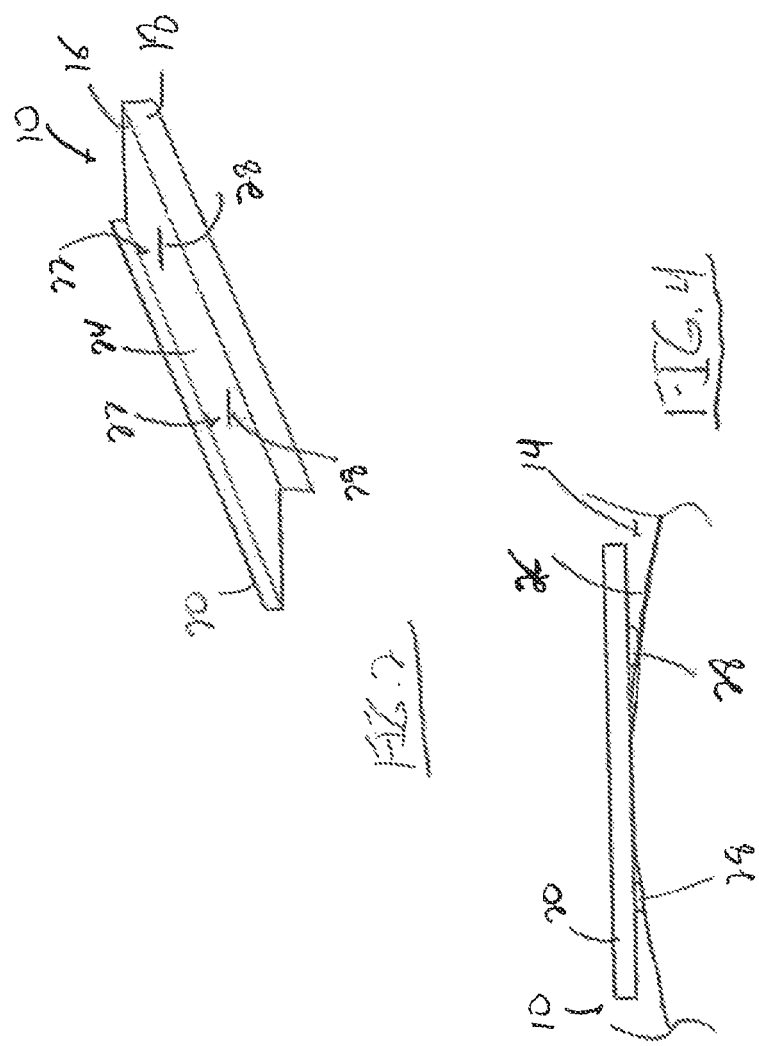

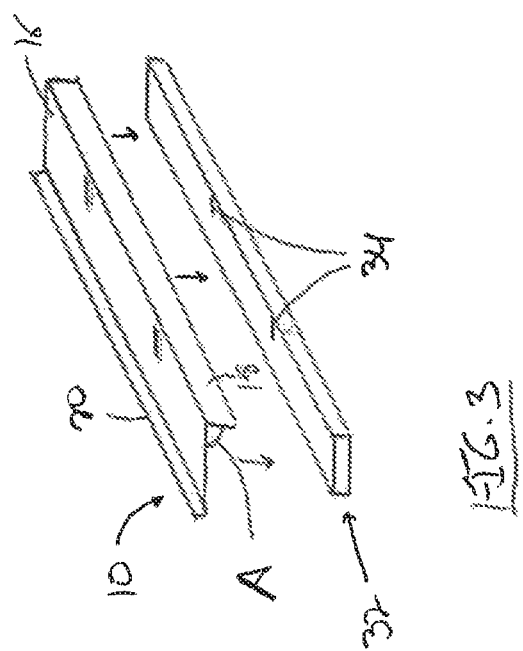

MAGNETIC APPLIANCE SHELF AND METHOD OF ASSEMBLY

CROSS-REFERENCE TO RELATED APPLICATIONS

The present application claims priority from U.S. Provisional Patent Application Ser. No. 62/498,408, filed on Dec. 6, 2016, the entirety of which is expressly incorporated herein by reference.

FIELD OF THE DISCLOSURE

The present disclosure relates generally to supporting structures and more specifically to support structures such as shelves that are releasably attached to appliances.

BACKGROUND OF THE DISCLOSURE

Appliances are used in households for the preservation and preparation of food for consumption within the household. In preparing the food products, oftentimes it is necessary to provide a flat surface on which to place the food and associated items prior to, during and after preparation of the food utilizing the appliances.

In many occasions, the flat surface is provided by a countertop located adjacent the appliances being used. However, the area of the countertop may either be too small or too far removed from the appliances to be effectively utilized in the preparation of the food products.

Therefore, it is desirable to develop a support surface that can be positioned on an appliance in order to provide ample area for placement of various items necessary during the preparation of various food products with the appliance.

SUMMARY OF THE DISCLOSURE

The present disclosure provides a support surface that includes a releasable support mechanism thereon capable of securing the support surface to an appliance.

According to one embodiment of the disclosure, the support surface includes a magnetic securing mechanism capable of engaging a surface of the appliance in order to secure the support surface to the appliance.

According to another embodiment of the disclosure, the support surface includes a lip disposed along an edge of the support surface. The lip provides a stop the limit the movement of any items placed on the shelf to prevent any items from sliding, rolling or otherwise falling off of the shelf.

According to a further aspect of the disclosure, a support structure for releasable attachment to an appliance includes a support surface, a first lip disposed on one edge of the support surface and at least one magnet disposed on the support surface and engageable with a complementary surface of the appliance.

According to still another aspect of the disclosure, a kit for forming a support structure adapted to be releasably secured to an appliance includes a support surface including at least one lip thereon, a jig including at least one angle corresponding to an angle formed between the support surface and the at least one lip, a first number of magnets securable to the jig and a second number of magnets securable to the support structure in alignment with the first number of magnets on the jig.

According to still a further aspect of the disclosure, a method for forming a support structure for releasable attachment to an appliance includes the steps of providing a support surface including at least one lip thereon, placing the support surface on a jig including a number of first magnets secured thereto and attaching a number of second magnets to the support surface in alignment with the number of first magnets.

Other aspects, features and advantages of the invention will be made apparent from the following detailed description taken together with the drawing figures.

BRIEF DESCRIPTION OF THE DRAWINGS

The drawing illustrate the best mode of practicing the present disclosure.

In the drawings:

FIG. 1 is an isometric view of a support member constructed according to one exemplary embodiment of the present disclosure.

FIG. 2 is an isometric view of the support member of FIG. 1.

FIG. 3 is an isometric view of the support member and a jig used in the construction of the support member.

FIG. 4 is a partially broken away rear plan view of another exemplary embodiment of the support member attached to an appliance.

DETAILED DESCRIPTION OF THE DISCLOSURE

With respect to the drawing figures in which like reference numerals designate like parts throughout the disclosure, an exemplary embodiment of a support structure is illustrated at 10 in FIG. 1. The support structure 10 is disposed on an appliance 12, such as a stove 14, and includes a planar support surface 16 with a forward, upwardly extending lip 18 located along one edge of the surface 16 and a rear, downwardly extending lip 20 located opposite the forward lip 18. In an exemplary embodiment, the forward lip 18 and the rear lip 20 can be formed with different lengths extending away from the support surface 16. Further, in another exemplary embodiment the forward lip 18 can extend downwardly at an angle from the support surface 16, with the rear lip 20 extending upwardly from the support surface 16. In this configuration the rear lip 20 acts as a stop for any items positioned on the support surface 16. (FIG. 4).

Referring now to FIGS. 1 and 2, the support structure 10 additionally includes a number if securement structures 22 located on a lower surface 24 of the support surface 16. The structures 22 are positioned on and engage a complementary surface 26 of the appliance 12 to secure the support surface 16 to the appliance 12.

In the exemplary illustrated embodiment in FIG. 2, the securement structures 22 are formed of magnets 28. The position of the magnets 28 on the lower surface 24 of the support surface 16 enables the magnets 24 to magnetically engage a metal surface 26 of the appliance 12. The magnetic force exerted by the magnets 28 on the surface 26 securely holds the support surface 16 on the appliance 12 in order to enable the support surface 16 to retain items (not shown) that are positioned thereon. Further, in on exemplary embodiment the magnets 28 can be closer to the rear lip 20 than the forward lip 18 in order to enable the support structure 16 to extend outwardly further over the appliance 12 and provide more usable space on the support surface 16.

To assist the magnets 28 in holding the support surface 16 on the appliance 12, the rear lip 20 has a length sufficient to extend along a surface 30 that is oriented perpendicular to the surface 26. Thus, while the magnets 28 securely hold the support structure 10 on the surface 24, the lip 30 engages the surface 30 to align the support structure 10 with the appliance 12.

Looking now at the exemplary embodiment of FIG. 3, to manufacture the support structure 10, initially a piece or blank of a suitable size material is formed into the support structure 10 by folding or otherwise deflecting opposed edges of the blank to formed the lips 18,20 on opposed sides of the generally planar support surface 16. The length of the lips 18,20 can be selected as desired in order to provide the desired functions of maintaining the items (not shown) on the support structure 10 and aligning the support structure 10 with the appliance 12. The material chosen for the formation of the support structure 10 can be selected from any suitable material, such as a plastic, metal, or wood among others.

To position and secure the magnets 28 to the support surface 16, a jig 32 is provided that is formed of a suitable material, such as a metal, plastic, wooden or otherwise effective substrate, and onto which are mounted, affixed, adhered or otherwise secured a number of magnets 34, such as magnets 34 formed of neodymium. The magnets 34 are secured to the jig 32 at a spatial distance that matches or mirrors the spatial distance between the magnets 28 on the support structure 10.

Regardless of the material forming the jig 32, the jig 32 includes at least one angle corresponding to the angle between the support surface 16 and the rear lip 20, or forward lip 18. With this angle the support structure 10 can be positioned on and aligned with the jig 32 to locate the magnets 34 on the jig 32 immediately adjacent the locations for the magnets 28 on the support structure 10.

With the support structure 10 in this position, the magnets 28, which can be formed similarly to the magnets 34 in the jig 32, have an adhesive, epoxy or other suitable material applied thereto. The magnets 28 are subsequently positioned on the support surface 16 directly opposite the magnets 34 on the jig 32. The magnetic attraction between the magnets 34 on the jig 32 and the magnets 28 on the support surface 16 effectively draws and clamps or holds the magnets 28 on the support surface 16 at the desired location. The adhesive is allowed sufficient time to cure to affix the magnets 28 to the support surface 16. Once cured, the magnets 28 now bound to the article are covered with an adhesive backed silicone layer 36 (FIG. 4) which reduces friction between the magnets 28 and the surface 26 of the appliance 12 without affecting the magnetic attraction between the magnets 28 and the surface 26 to enable the magnets 28 to engage and hold to the appliance 12/surface 26 more securely.

Further, the support member 16, with one or both lips 18,20, the magnets 28,34, adhesive (not shown) and jig 32 can be formed as a kit enabling an individual to form the support structure 10 to conform specifically to the shape of the appliance 12 to which the support structure 10 is to be secured.

Looking now at FIG. 4, in the illustrated alternative embodiment, the magnets 28 are spaced from one another a sufficient distance to accommodate a surface 26 on the appliance 12 and/or stove 14 that is curved. With this spacing, and optionally in conjunction with the thickness of the magnets 28 and the optional backing layer 36, the magnets 28 support the support surface 16 and an upwardly extending rear lip 20 in a horizontal configuration to enable the support surface 16 to stably support and hold items thereon. Further, in this embodiment the forward lip 18 can extend from the support surface 16 in a manner that conforms to the shape of the adjacent surface of the appliance 12, which can be vertical or at an angle with respect to vertical, for example.

Other alternative embodiments of the present disclosure are contemplated as being within the scope of the following claims particularly pointing out and distinctly claiming the subject matter regarded as the invention.

I claim:

1. A kit for forming a support structure adapted to be releasably secured to an appliance; the kit comprising:
    a support surface including at least one lip thereon;
    a non-magnetic jig including at least one angle corresponding to an angle formed between the support surface and the at least one lip;
    a first number of magnets securable to the jig; and
    a second number of magnets securable to the support structure in alignment with the first number of magnets on the jig.

2. The kit of claim 1 further comprising an adhesive for securing the first number of magnets to the jig and the second number of magnets to the support surface.

3. A method for forming a support structure for releasable attachment to an appliance; the method comprising the steps of:
    providing a support surface including at least one lip thereon;
    placing the support surface on a non-magnetic jig including a number of first magnets secured thereto; and
    attaching a number of second magnets to the support surface in alignment with the number of first magnets.

4. The method of claim 3 wherein the step of attaching the number of second magnets to the support surface comprises:
    applying an adhesive to the second magnets; and
    placing the second magnets on the support surface.

5. A method for forming a support structure for releasable attachment to an appliance; the method comprising the steps of:
    providing a support surface including at least one lip thereon;
    placing the support surface on a jig including a number of first magnets secured thereto; and
    attaching a number of second magnets to the support surface in alignment with the number of first magnets,
    wherein the step of attaching the number of second magnets to the support surface comprises:
        i. applying an adhesive to the second magnets; and
        ii. placing the second magnets on the support surface,
    further comprising the step of clamping the adhesive and the second magnets to the support surface with the first magnets.

6. The method of claim 3 wherein the at least one lip and the support surface form an angle therebetween and wherein the jig includes at least one complementary angle for alignment of the support surface and lip with the jig.

7. The method of claim 3 further comprising the step of applying a slip resistant layer over the second magnets.

8. The kit of claim 1 further comprising a second lip disposed on the support surface and spaced from the first lip, wherein the second lip is spaced along an opposite edge of the support surface from the first lip and extends in a direction opposite the first lip.

9. The kit of claim 8 wherein the first lip and second lip have different lengths.

* * * * *